United States Patent
Peana et al.

(10) Patent No.: US 12,354,246 B2
(45) Date of Patent: Jul. 8, 2025

(54) TEXT SHARPENING FOR LEGIBILITY ENHANCEMENT OR DISPLAY POWER SAVINGS

(71) Applicant: DELL PRODUCTS L.P., Round Rock, TX (US)

(72) Inventors: Stefan Peana, Austin, TX (US); Daniel Hamlin, Round Rock, TX (US)

(73) Assignee: Delll Products L.P., Round Rock, TX (US)

( * ) Notice: Subject to any disclaimer, the term of this patent is extended or adjusted under 35 U.S.C. 154(b) by 445 days.

(21) Appl. No.: 17/970,746

(22) Filed: Oct. 21, 2022

(65) Prior Publication Data

US 2024/0135504 A1 Apr. 25, 2024
US 2024/0233096 A9 Jul. 11, 2024

(51) Int. Cl.
*G06T 5/73* (2024.01)
*G06T 5/70* (2024.01)
*G09G 3/20* (2006.01)

(52) U.S. Cl.
CPC .............. *G06T 5/73* (2024.01); *G06T 5/70* (2024.01); *G09G 3/20* (2013.01);
(Continued)

(58) Field of Classification Search
CPC ... G06T 5/73; G06T 5/70; G06T 2207/20192; G06T 2207/10024; G06T 5/20; G06T 1/20; G06T 11/001; G06T 11/60; G06T 19/06; G06T 3/18; G06T 5/00; G06T 5/002; G06T 7/20; G06T 5/40; G06T 7/0079; G06T 2207/10028; G06T 2207/30168; G09G 3/20; G09G 2330/021; G09G 2360/144; G09G 2320/0626; G09G 2354/00; G09G 2360/06; G09G 2370/04; G09G 2370/10; G09G 2370/14; G09G 5/363; G09G 2340/14; G09G 5/02; G09G 5/26; G09G 5/28; G09G 2320/066; H04N 13/0271; H04N 13/0203; H04N 13/0048;
(Continued)

(56) References Cited

U.S. PATENT DOCUMENTS

| 7,348,991 B1 * | 3/2008 | Keating | ............... G06T 5/92 345/589 |
| 2010/0177962 A1 * | 7/2010 | Kalman | ............... G06T 5/73 348/241 |

(Continued)

*Primary Examiner* — Jose L Couso
(74) *Attorney, Agent, or Firm* — Larson Newman, LLP (57) ABSTRACT

An information handling system includes a display device and a processor. The display device outputs pixels associated with a text font. The processor converts red, green, blue (RGB) pixels to image perspective transformation (IPT) pixels. The processor further sharpens one or more of the IPT pixels that do not have color. The sharpening of the one or more of the IPT pixels identifies edges of the text font and defines widths of the text font. The processor corrects edge overshoot and edge undershoot created by a digital filter. The edge overshoot and the edge undershoot are corrected for each IPT pixel associated with the text edges. The processor also reduces noise enhancement in the sharpened IPT pixels, retains grey text portions of each of the sharpened IPT pixels, and converts the IPT pixels to new RGB pixels. The processor outputs the new RGB pixels to the display device.

20 Claims, 9 Drawing Sheets

(52) U.S. Cl.
CPC .............. *G06T 2207/20192* (2013.01); *G09G 2330/021* (2013.01); *G09G 2360/144* (2013.01)

(58) Field of Classification Search
CPC .. H04N 13/128; H04N 13/161; H04N 13/204; H04N 13/239; H04N 13/271; H04N 2013/0081; H04N 2013/0092; G06F 3/011; G06F 3/012; G06F 3/0346; G06F 40/109; G06F 3/0482; G06V 20/62; G06V 20/63; G06V 30/224; G06V 30/10; G06V 10/56
See application file for complete search history.

(56) References Cited

U.S. PATENT DOCUMENTS

| | | | |
|---|---|---|---|
| 2017/0061234 A1* | 3/2017 | Lim | .......................... G06T 3/40 |
| 2017/0127046 A1 | 5/2017 | Das | |
| 2021/0150659 A1 | 5/2021 | Guerra et al. | |

* cited by examiner

TEXT SHARPENING FOR LEGIBILITY ENHANCEMENT OR DISPLAY POWER SAVINGS

FIELD OF THE DISCLOSURE

The present disclosure generally relates to information handling systems, and more particularly relates to text sharpening for legibility enhancement or display power savings.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a display device and a processor. The display device output pixels associated with a text font. The processor may convert red, green, blue (RGB) pixels to image perspective transformation (IPT) pixels. The processor further may sharpen one or more of the IPT pixels that do not have color. The sharpening of the one or more of the IPT pixels identifies edges of the text font and defines widths of the text font. The processor may correct edge overshoot and edge undershoot created by a digital filter. The edge overshoot and the edge undershoot are corrected for each IPT pixel associated with the text edges. The processor also may reduce noise enhancement in the sharpened IPT pixels, retain grey text portions of each of the sharpened IPT pixels, and convert the IPT pixels to new RGB pixels. The processor may output the new RGB pixels to the display device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
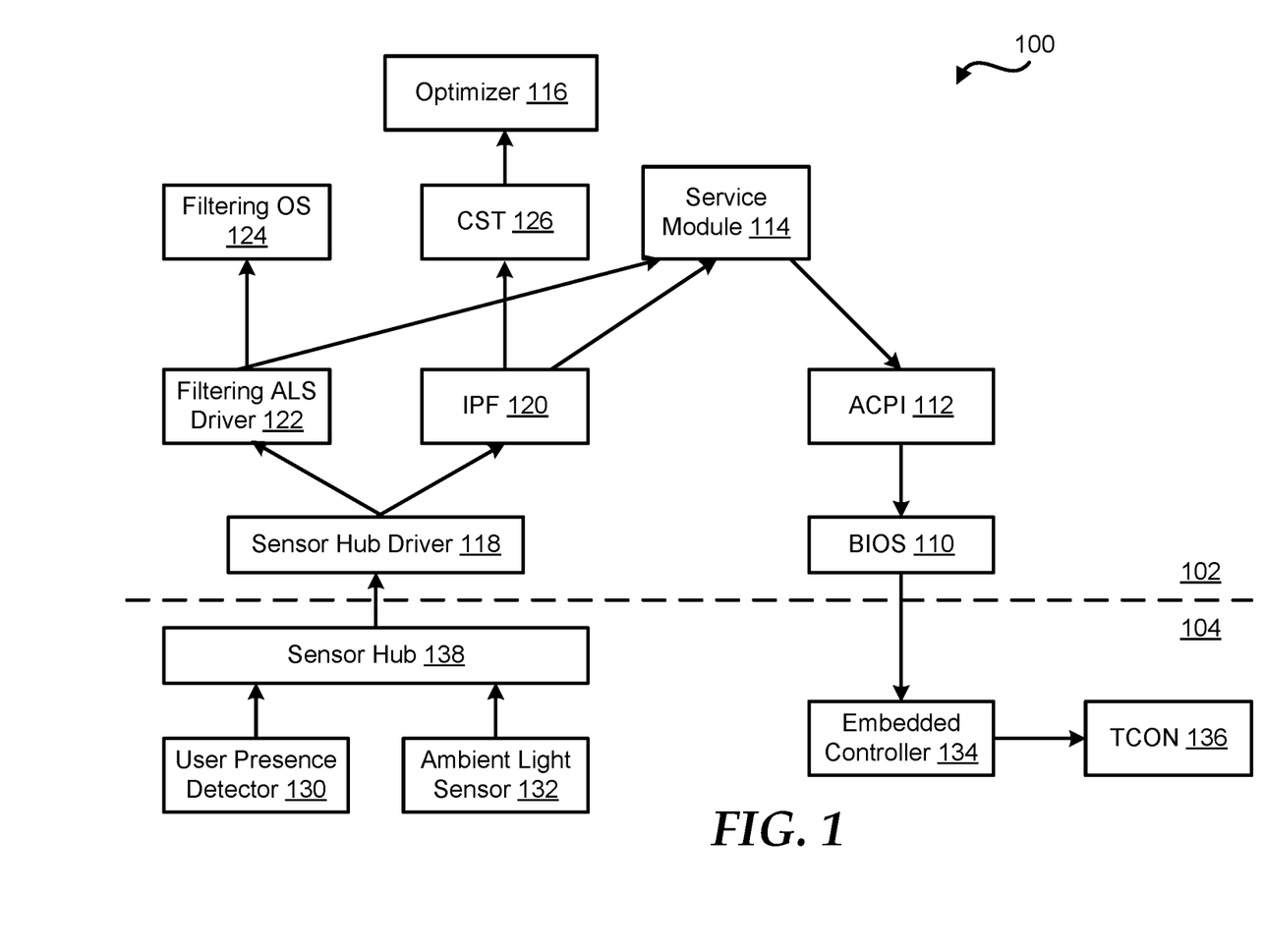
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a software components 102 and hardware components 104. Software components 102 include a BIOS 110, an advanced configuration and power interface (ACPI) 112, a service module 114, an optimizer 116, service hub driver 118, an IPF 120, a filtering ambient light sensor (ALS) driver 122, a filtering OS 124, and a CST 126. Other components 104 include a user presence detector (UPD) 130, an ALS 132, an embedded controller 134, and TCON 136, and a service hub 138. In certain examples, BIOS 110, ACPI 112, service module 114, optimizer 116, ISH driver 118, IPF 120, filtering ALS driver 122, MSFT OS 124, and CST 126 may be executed by one or more processors within information handling system 100, such as processors 1102 and 1104 in FIG. 11. In an example, the components illustrated in FIG. 1 may be located in an information handling system or a display device of the information handling system without varying from the scope of this disclosure. Information handling system 100 may include additional components without varying from the scope of this disclosure.

During operation, UPD 130 may perform any suitable operations to detect a presence of a user from a display device of information handling system 100. UPD 130 also may measure or detect a distance that the user is from the display device. Based on the detection of a user, UPD 130 may measure the distance and provide the measured distance to IPF 120 via sensor hub 138 and sensor hub driver 118. In response to receiving the measured distance of the user, IPF 120 may forward the distance to optimizer 116 via CST 126, and to service module 114. In certain examples, service module 114 and optimizer 116 may utilize the measured distance to adaptively determine whether to sharpen pixels associated with text font as will be described herein.

In an example, ALS 132 may measure an amount of ambient light around the display device of information handling system 100. After measuring the amount of ambient light, ALS 132 may provide the amount to filtering ALS driver 122 via sensor hub 138 and sensor hub 118. Filtering ALS driver 122 may provide the amount of ambient light to both service module 114 and sensor hub 124. In certain examples, service module 114 and sensor hub 124 may utilize the measured distance to adaptively determine whether to sharpen pixels associated with text font as will be described herein.

In certain examples, pixels for output to a display device may be in a RGB format. In these examples, the pixels may be referred to a RGB pixels. In an example, a processor may convert the red, green, blue (RGB) pixels to image perspective transformation (IPT) pixels. In an example, the conversion of RGB pixels to IPT pixels may be performed in any suitable manner known in the art. The conversion of RGB pixels to IPT pixels may be performed to separate image brightness (I) from image color (PT). In certain examples, only the image brightness portion of the pixel needs to be sharpened for better text readability. In an example, the pixels may be associated with font text for output on a display device of information handling system 100.

Filtering OS 124 may be a digital filter to sharpen I pixel values. In an example, pixels that are sharpened may not have a color, such as pixels with P and T values near zero. In certain examples, only those pixels without color are sharpened to avoid enhancing the color added to text edges, which in turn may reduce edge jaggies in anti-aliasing. In an example, the digital filter of filtering OS 124 may be any suitable filter, such as a 3×3 convolution filter having negative values around the pixel being sharpened to bring negative background values into the text represented by the pixel as will be described with respect to FIGS. 3-5.

In an example, optimizer 116 may perform one or more suitable operations to avoid, prevent, or correct high overshoot and low undershoot in a digital filter. For example, optimizer 116 may compare a sharpened pixel value to a high background input value and may determine whether the sharpened pixel value is substantially equal to the high background input value. If the sharpened pixel value is not substantially equal to the high background input value, optimizer 116 may replace the sharpened pixel value with the high background input value.

If the sharpened pixel value is substantially equal to the high background input value, optimizer 116 may determine whether the sharpened pixel is substantially equal to a dark text input value. If the sharpened pixel value is substantially equal to the dark text input value, optimizer 116 may replace the sharpened pixel value with the dark text input value. If the sharpened pixel value is not substantially equal to the dark text input value, optimizer 116 may maintain the sharpened pixel value. In an example, optimizer 116 may adaptively perform the operations described above to prevent overshoot and undershoot artifacts from being produced on text edges and maintain text font widths.

In an example, EC 134 of information handling system 100 may execute optimizer 116, service module 114, or the like to perform one or more suitable operations to reduce noise around edges of the text font. For example, EC 134 may compare a difference between a digital value of a pixel and a digital value of a neighboring pixel. In an example, the processor may perform this measurement or comparison iteratively for a pixel with each neighboring pixel. The processor may determine whether the difference is greater than a predetermined value or threshold. In an example, the predetermined threshold may be any suitable value, such as four, five, six, or the like. In certain examples, as the predetermined value increases an amount of background noise difference needed before sharpening the pixel is increased. In an example, the threshold may be adjusted to handle lower or higher noise inputs.

If the difference is greater than the threshold value, the processor may sharpen the pixel. However, if the difference is not greater than the threshold value, the processor may not perform sharpening operations on the pixel and move to a next pixel in the font text. In certain examples, a median filter may be added to reduce noise before sharpening the pixel without varying from the scope of this disclosure. In an example, limiting the pixels that are sharpened may result in power savings for information handling system 100.

In an example, EC 134 of information handling system 100 may perform one or more suitable operations to sharpen pixels with dark values. For example, the processor may measure or determine a digital value of a pixel and determine whether the digital value is greater than a threshold. In an example, the predetermined threshold may be any suitable value, such as nine, ten, eleven, or the like. In certain examples, light grey text pixels may have a digital value less than the predetermined threshold and may be placed in font text for artistic or user interface reasons and may not need to be removed. In an example, the threshold to identify light grey text values may be adjusted.

If the digital value is greater than the threshold value, the processor may sharpen the pixel. If the digital value is not greater than the threshold value, the processor may not perform any sharpening operations on the pixel. The processor may iteratively perform these operations on all edge pixels. In an example, limiting the pixels that are sharpened may result in power savings within information handling system 100.

In an example, service module 114 may receive an amount of ambient light from filtering ALS driver 122 and receive a distance a user is found the display device from IPF 120. Based on the amount of ambient light and the distance of the user, service modules 114 may create a table or index with ACPI 112. In certain examples, EC 134 may utilize BIOS 110 to access ACPI 112 and retrieve the ambient light from the index. EC 134 may determine whether the amount ambient light input data is greater than a threshold. In certain examples, the threshold value may be any suitable value, such as 1300 lux, 1350 lux, 1400 lux, 1450 lux, or the like. If the ambient light input data is greater than the threshold value, EC 134 may eliminate power savings and perform pixel sharpening. If the input data is not greater than the threshold, EC 134 may not further sharpen the pixels so that TCON 136 may experience power savings. However, when an amount of ambient light is above the threshold, EC 134 eliminates the power savings in TCON 136 by pixel sharpening being performed to increased text readability in high ambient light settings.

In certain examples, the amount of ambient light may be categorized into multiple different ranges and each range may have a different amount of power savings in TCON 136. In an example, the ambient light ranges include: a first range that is less than 200 lux, a second range that is 200 to 1400 lux, and a third range that greater than 1400 lux. In certain examples, an amount of power savings in TCON 136 may vary among the different ambient light ranges. For example, the first range may have a first amount of power savings, the second range may have a second and highest amount of power savings, and the third range may have a third and lowest amount of power savings. In a non-limiting example, the first amount of power savings may be around 100 mW, the second amount of power savings may be around 400 mW, and the third amount of power savings may be 0 mW.

In certain examples, EC 134 may utilize BIOS 110 to access ACPI 112 and retrieve the distance of the user from the display device stored in the index. EC 134 may determine whether the distance is greater than a threshold. In certain examples, the threshold may be any suitable distance, such as sixteen inches, seventeen inches, eighteen inches, nineteen inches, or the like.

If the distanced is greater than the threshold, EC 134 may eliminate power savings in TCON 136 and perform pixel sharpening. If the distance is not greater than the threshold, EC 134 does not perform any pixel sharpening, which in turn may result in power savings within TCON 136. However, when the distance of the user from the display device is above the threshold, the power savings is eliminated by pixel sharpening being performed to increased text readability when the user is far from the display device.

After the pixels have been analyzed and sharpened if needed, TCON 136 may convert the IPT pixels to RGB pixels. In certain examples, the conversion of the IPT pixels to RGB pixels may being performed to prepare the pixels to be output to a display device.

In an example, TCON 136 may retrieve a table of backlight reduction values. In an example, the table of backlight reduction values may be determined and created in any suitable manner. For example, the table of backlight reduction values may be created based on user testing to reduce a backlight brightness and power usage while maintaining a high text readability. The table of backlight reduction values may be stored in a memory of information handling system 100. In certain examples, TCON 136 may change the backlight based on amount of ambient light. In certain examples, as a value of the ambient light sensor input reduces, the backlight reduction may be increased.

In certain examples, an OS of information handling system 100 may send data to TCON 136 in any suitable manner. For example, the OS may set registers within TCON 136 to pass the data. In an example, the register may include any suitable number of fields including, but not limited to, an ALS_CONTROL field, a POWER_SOURCE field, an IMAGE_ENHANCEMENT field, a TEXT_ENCHANCEMENT field, and an ALS_READING field.

In certain examples, the OS may set the ALS_CONTROL field to a digital high to indicate that the OS will control the backlight of the display device and set the ALS_CONTROL field to a digital low to indicate that a user will control the backlight settings. The OS may set the POWER_SOURCE field to a digital high to indicate AC power and set the POWER_SOURCE field to a digital low to indicate battery power. In an example, the OS may set the IMAGE_ENHANCEMENT field to a digital high to enable image enhancement and set the IMAGE_ENHANCEMENT field to a digital low to disable image enhancement. In certain examples, the OS may set the TEXT_ENHANCEMENT field to a digital high to enable text enhancement and set the TEXT_ENHANCEMENT field to a digital low to disable text enhancement. The OS may set the ALS_READING field to '00' to indicate an ambient light value below 200 lux, '01' to indicate an ambient light value between 150 and 550 lux, '10' to indicate an ambient light value between 500 and 1450 lux, and '11' to indicate an ambient light value above 1400 lux.

In an example, information handling system 100 may be improved by adaptively sharpening text edges pixels based on power savings, ambient light, and a distance a user is from the information handling system. For example, information handling system 100 may perform one or more suitable operations to adaptively filter pixels associated within text font output to a display device. EC 134 within information handling system 100 may adaptively utilize a digital filter to identify text edges, to define text font widths, to avoid text edge overshoot and undershoot, avoid noise enhancement, retain light grey text and graphics, or the like.

In an example, EC 134 of information handling system 100 may also utilize a blended filter to average pixel darkness levels across a text font width to darken the text font. The processor may further control a combination of text enhancement and a display brightness setting to optimize power savings within information handling system 100, a display device, or the like. In certain examples, the processor may link or combine text sharpening and a display brightness setting to an ALS input to create display power savings. Additionally, information handling system 100 may be improved by performing pixel sharpening to create a low or high legibility magnitude of the text font based on an ambient light level. In an example, information handling system 100 may be improved by performing pixel sharpening to create a low or high legibility magnitude of the text font based on a distance of a user from the display device.

Figure 2:
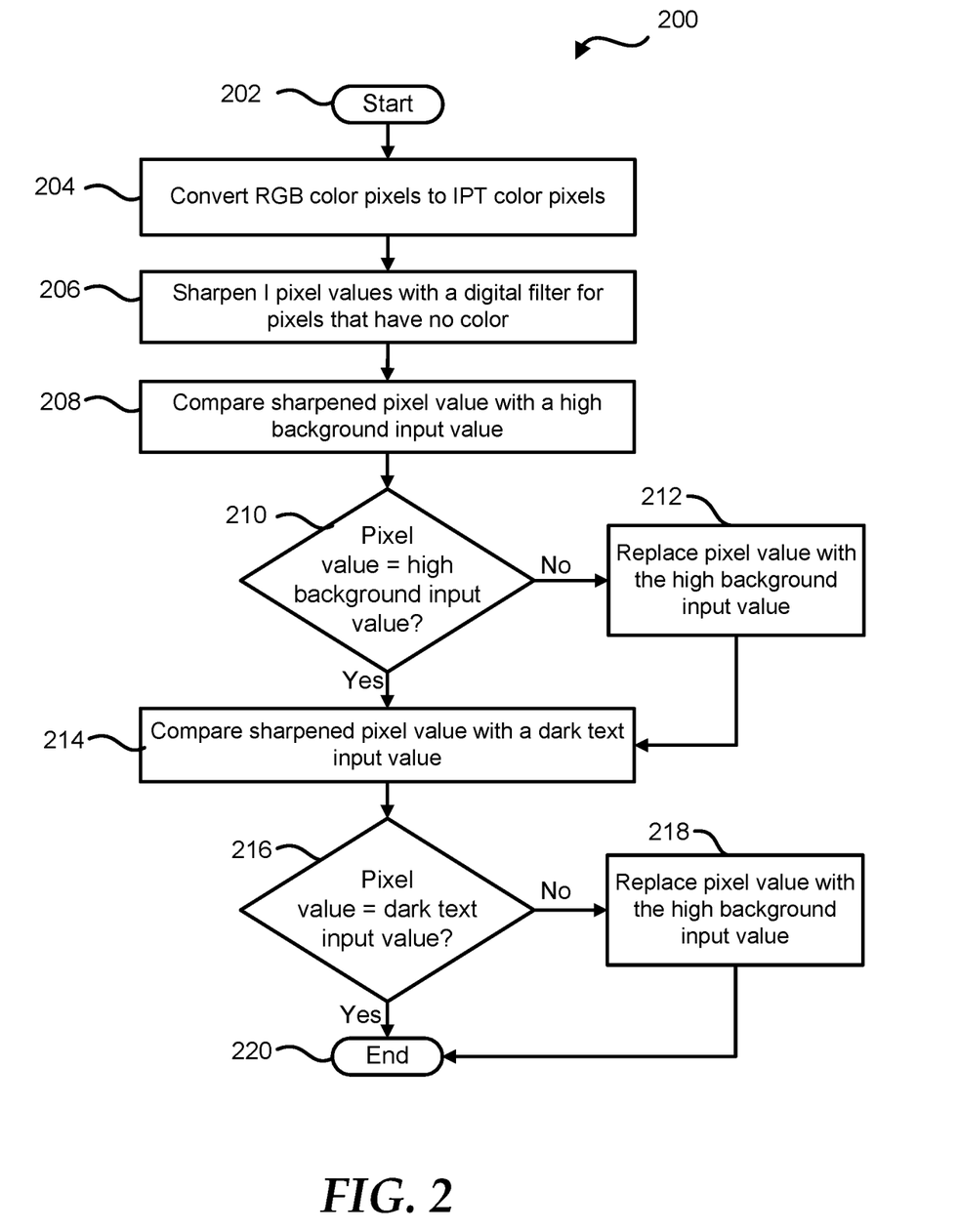
FIG. 2 is a flow diagram of a method for preventing overshoot and undershoot artifacts on text edges while maintaining text font widths according to at least one embodiment of the present disclosure.

FIG. 2 illustrates a flow diagram of a method 200 for preventing overshoot and undershoot artifacts on text edges while maintaining text font widths according to at least one embodiment of the present disclosure, starting at block 202. In an example, the method 200 may be performed by any suitable combination of components including, but not limited to, processor 102, user presence detector 130, ambient light sensor 132, embedded controller 134, and TCON 136 of FIG. 1 or BIOS 1140 of FIG. 11. Not every method step set forth in this flow diagram is always necessary, and certain steps of the methods may be combined, performed simultaneously, in a different order, or perhaps omitted, without varying from the scope of the disclosure. In an example, the flows described in FIGS. 2 and 6-9 may be part of the same sequence of operations and may be performed one after another or in any other order.

At block 204, RGB pixels are converted to IPT pixels. In an example, the conversion of RGB pixels to IPT pixels may be performed in any suitable manner known in the art. The conversion of RGB pixels to IPT pixels may be performed to separate image brightness (I) from image color (PT). In certain examples, only image brightness needs to be sharpened for better text readability. However, sharpening of image color may create color rainbow artifacts on text edges due to color anti-aliasing added to soften text edges. In an example, the pixels may be pixels representing font text on a display device of an information handling system.

At block 206, I pixel values are sharpened with a digital filter. In an example, pixels that are sharpened may not have a color, such as P and T for the pixel are near zero. In an example, the digital filter may be any suitable filter, such as a 3×3 convolution filter having negative values around the pixel being sharpened to bring negative background values into the text represented by the pixel as will be described with respect to FIGS. 3-5.

At block 208, a sharpened pixel value is compared with a high background input value. At block 210, a determination is made whether the sharpened pixel value is substantially equal to the high background input value. If the sharpened pixel value is not substantially equal to the high background input value, the sharpened pixel value is replaced with the high background input value at block 212 and the flow continues at block 214.

If the sharpened pixel value is substantially equal to the high background input value, a determination is made whether the sharpened pixel is substantially equal to a dark text input value at block 214. If the sharpened pixel value is substantially equal to the dark text input value, the sharpened pixel value is replaced by the dark text input value at block 218 and the flow ends at block 220. If the sharpened pixel value is not substantially equal to the dark text input value, the flow ends at block 220. In an example, blocks 210-218 may be referred to as an adaptive process, and this adaptive process may prevent overshoot and undershoot artifacts from being produced on text edges and may maintain text font widths.

Figure 3:
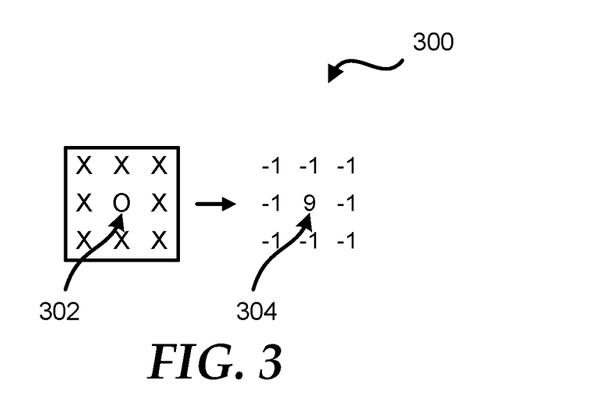
FIGS. 3-5 are diagrams of a walking filter analyzing multiple pixels according to at least one embodiment of the present disclosure.
Figure 4:
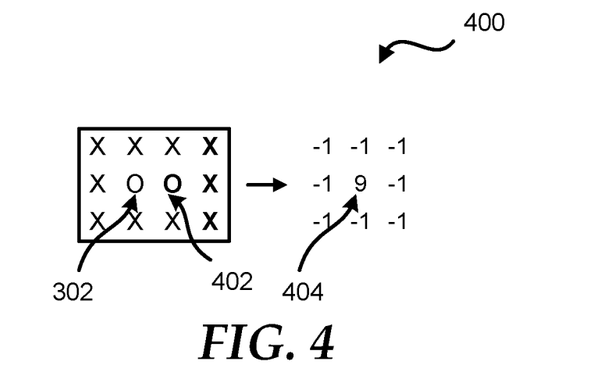
Figure 5:
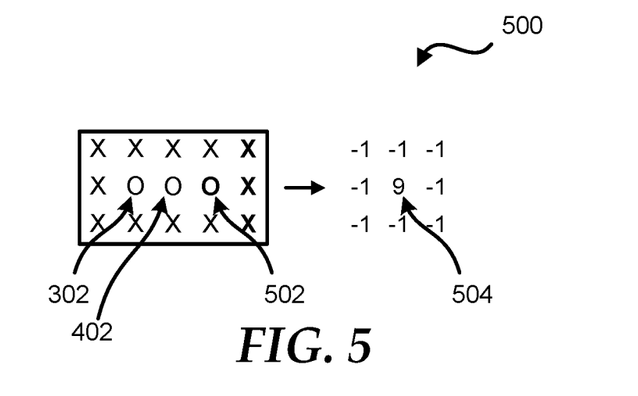

FIGS. 3-5 illustrate a walking filter that may be utilized to analyze multiple pixels via sequences 300, 400, and 500 according to at least one embodiment of the present disclosure. Referring now to FIG. 3, during filtering operation 300, a single pixel 302, indicated as pixel 0, may be analyzed based on neighboring pixel, indicated as pixels X. In an example, the higher a center value 304, such as the digital value of the pixel being sharpened, the more sharpening performed. In a particular example, the sum of the digital values should be 1. For example, if the digital values of the neighboring pixels are negative values, such as negative one, value 304 of the center pixel may be higher, such as nine.

Figure 11:
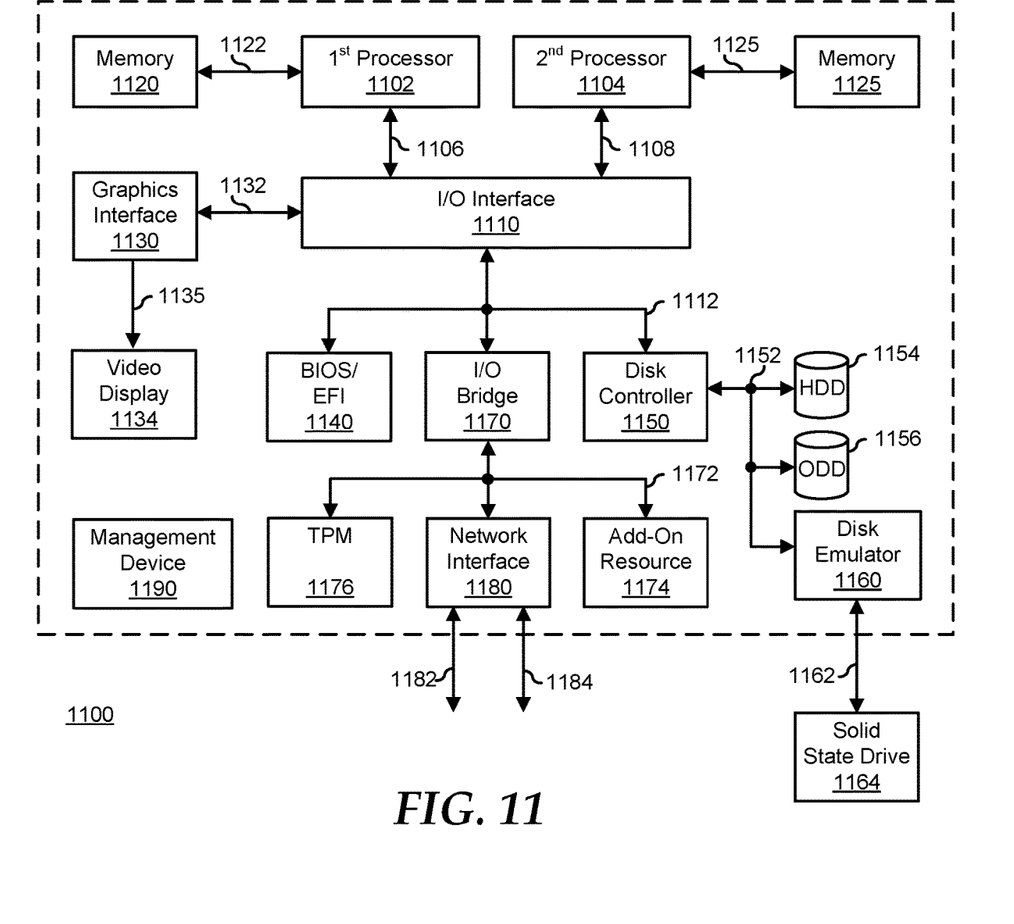
FIG. 11 is a block diagram of a general information handling system according to an embodiment of the present disclosure.

Referring now to FIG. 4, during filtering operation 400, the digital value for the last analyzed pixel 302 may be stored in a memory, such as memory 1120 of FIG. 11. In an example, this stored value may be utilized for the next iteration of the walking filter. In this next iteration, a new pixel 402 may be selected and may be analyzed based on the neighboring pixels. During iteration 400, pixel 402 may be analyzed based on the previous digital value stored for neighboring pixel 302 and the other neighboring pixels X. As described above with respect to FIG. 3, the higher the center value, such as the digital value of pixel 402 being sharpened, the more sharpening performed. In a particular example, the sum of the digital values should be 1. For example, if the digital values of the neighboring pixels are negative values, such as negative one, the value of center pixel 402 may be higher, such as nine.

Referring now to FIG. 5, during filtering operation 500, the digital value for the last analyzed pixel 402 may be stored in a memory, such as memory 1120 of FIG. 11. In an example, this stored value may be utilized for the next iteration of the walking filter. In this next iteration, a new pixel 502 may be selected and may be analyzed based on the neighboring pixels. During iteration 500, pixel 502 may be analyzed based on the previous digital value stored for neighboring pixel 402 and the other neighboring pixels X. As described above with respect to FIG. 3, the higher the center value, such as the digital value of pixel 502 being sharpened, the more sharpening performed. In a particular example, the sum of the digital values should be 1. For example, if the digital values of the neighboring pixels are negative values, such as negative one, the value of center pixel 502 may be higher, such as nine. In an example, after a last pixel is scanned, all memory values may be analyzed to set local and global pixel values.

Figure 6:
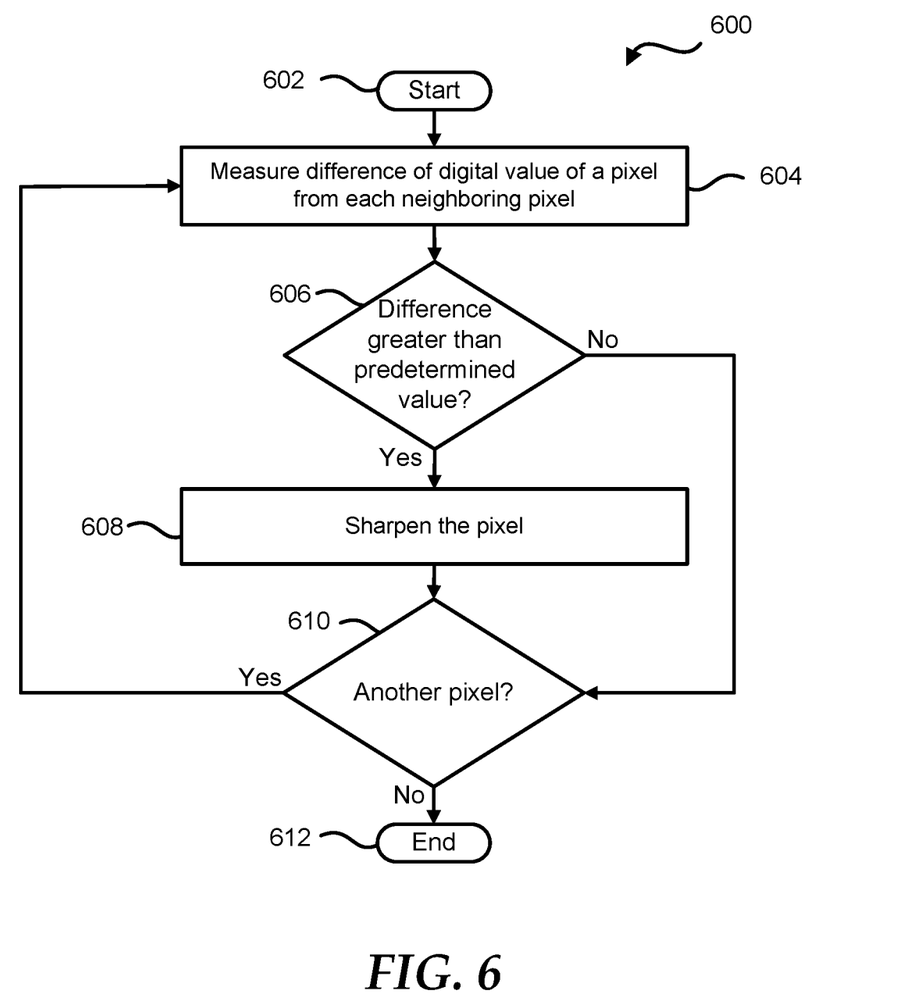
FIG. 6 is a flow diagram of a method for preventing noise along text edges according to at least one embodiment of the present disclosure.

FIG. 6 illustrates a flow diagram of a method 600 for preventing noise along text edges according to at least one embodiment of the present disclosure, starting at block 602. In an example, the method 600 may be performed by any suitable combination of components including, but not limited to, processor 102, user presence detector 130, ambient light sensor 132, embedded controller 134, and TCON 136 of FIG. 1 or BIOS 1140 of FIG. 11. Not every method step set forth in this flow diagram is always necessary, and certain steps of the methods may be combined, performed simultaneously, in a different order, or perhaps omitted, without varying from the scope of the disclosure.

At block 604, a difference between a digital value of a pixel and a digital value of a neighboring pixel is compared. In an example, this measurement or comparison may be performed for the iteratively for a pixel with each neighboring pixel. At block 606, a determination is made whether the difference is greater than a predetermined value or threshold. In an example, the predetermined threshold may be any suitable value, such as four, five, six, or the like. In certain examples, as the predetermined value increases an amount of background noise difference needed before sharpening the pixel is increased. In an example, the threshold may be adjusted to handle lower or higher noise inputs.

If the difference is greater than the threshold value, the pixel is sharpened at block 608 and the flow continues at block 610. If the difference is not greater than the threshold value, a determination is made whether another pixel is to be analyzed and possibly sharpened at block 610. If another pixel is available to be analyzed, the flow continues as described above at block 604. Otherwise, if no other pixels need to be analyzed, the flow ends at block 612. In certain examples, a median filter may be added in the process of method 600 to reduce noise before sharpening the pixel without varying from the scope of this disclosure. In an example, limiting the pixels that are sharpened may result in power savings within a display device, such as video display 1134 of information handling system 1100 in FIG. 11.

Figure 7:
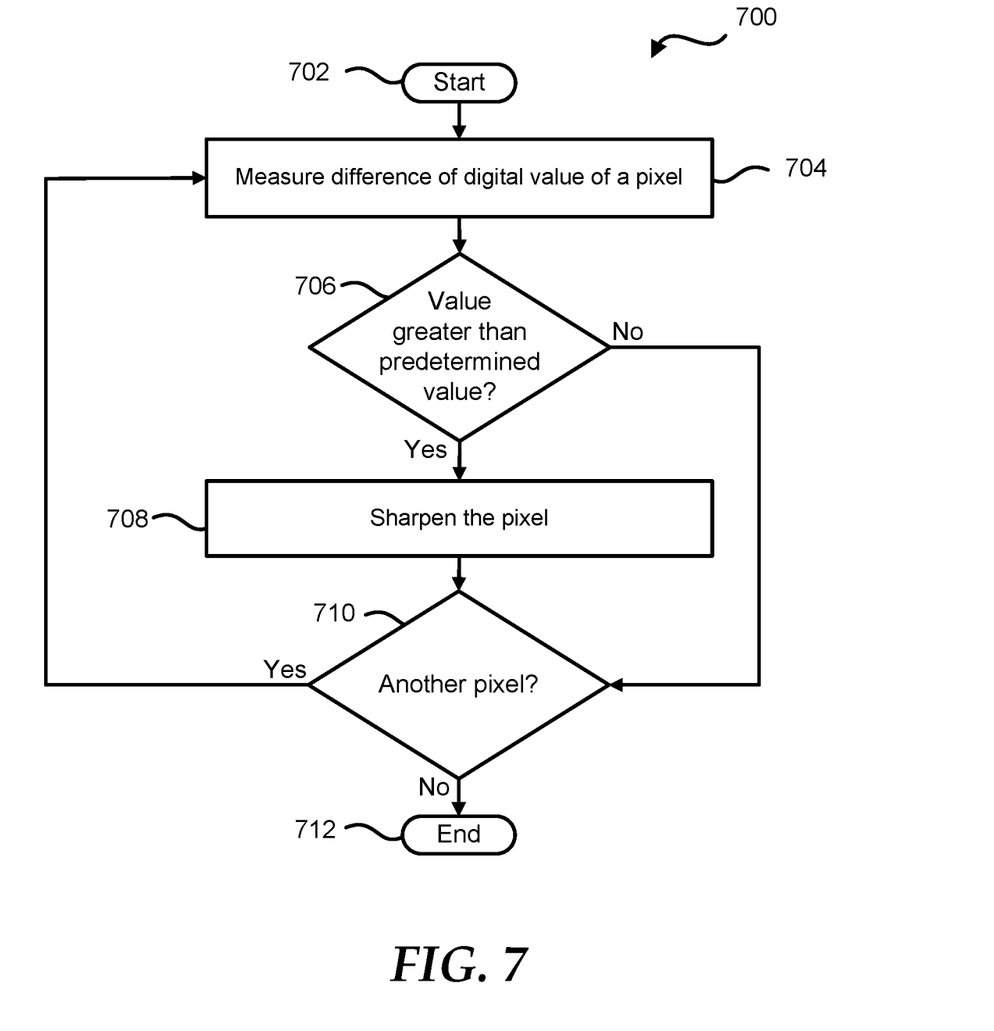
FIG. 7 is a flow diagram of a method for avoiding sharpening light grey text pixels according to at least one embodiment of the present disclosure.

FIG. 7 illustrates a flow diagram of a method 700 for avoiding sharpening light grey text pixels according to at least one embodiment of the present disclosure, starting at block 702. In an example, the method 700 may be performed by any suitable component including, but not limited to, EC 134 or TCON 136 of FIG. 1, and processor 1102 or 1104 or BIOS 1140 of FIG. 11. Not every method step set forth in this flow diagram is always necessary, and certain steps of the methods may be combined, performed simultaneously, in a different order, or perhaps omitted, without varying from the scope of the disclosure.

At block 704, a digital value of a pixel is measured or determined. At block 706, a determination is made whether the digital value is greater than a threshold. In an example, the predetermined threshold may be any suitable value, such as nine, ten, eleven, or the like. In certain examples, light grey text pixels may have a digital value less than the predetermined threshold and may be placed in font text for artistic or user interface reasons and may not need to be removed. In an example, the threshold to identify light grey text values may be adjusted.

If the digital value is greater than the threshold value, the pixel is sharpened at block 708 and the flow continues at block 710. If the digital value is not greater than the threshold value, a determination is made whether another pixel is to be analyzed and possibly sharpened at block 710. If another pixel is available to be analyzed, the flow continues as described above at block 704. Otherwise, if no other pixels need to be analyzed, the flow ends at block 712. In an example, limiting the pixels that are sharpened may result in power savings within the display device.

Figure 8:
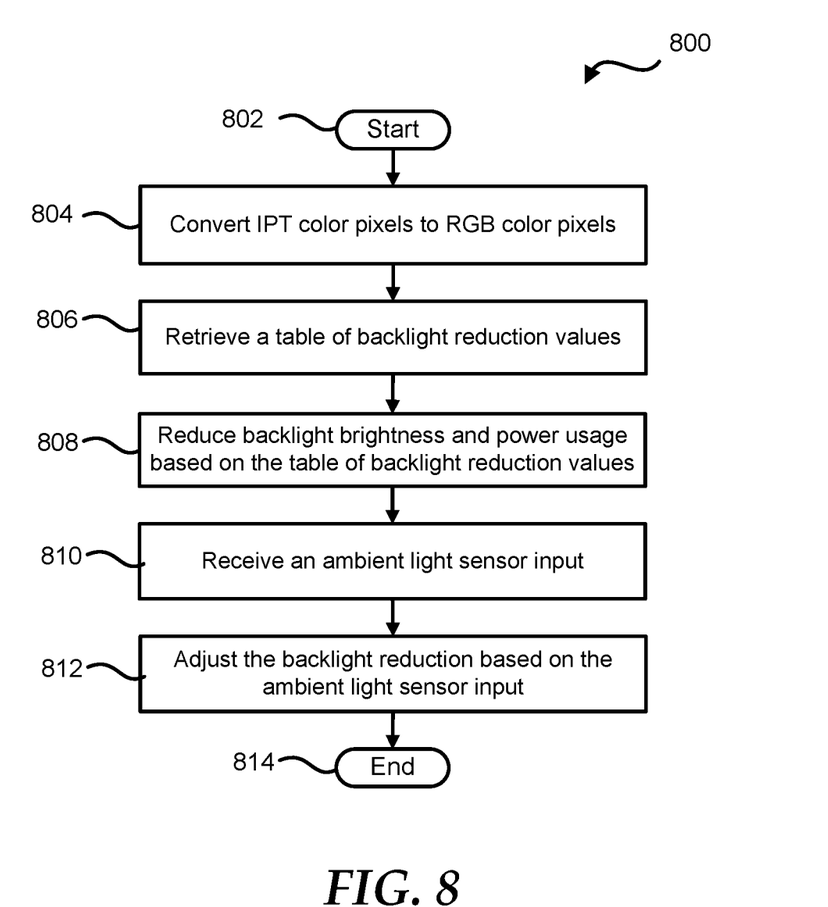
FIG. 8 is a flow diagram of a method for adjusting a backlight reduction based on an ambient light sensor input according to at least one embodiment of the present disclosure.

FIG. 8 illustrates a flow diagram of a method 800 for adjusting a backlight reduction based on an ambient light sensor input according to at least one embodiment of the present disclosure, starting at block 802. In an example, the method 800 may be performed by any suitable component including, but not limited to, EC 134 or TCON 136 of FIG. 1, and processor 1102 or 1104 or BIOS 1140 of FIG. 11. Not every method step set forth in this flow diagram is always necessary, and certain steps of the methods may be combined, performed simultaneously, in a different order, or perhaps omitted, without varying from the scope of the disclosure.

At block 804, the IPT pixels are converted to RGB pixels. In an example, the IPT pixels may have been previously analyzed a possibly sharpened based on the methods 200, 600, and 700 described above with respect to FIGS. 2, 6, and 7. In certain examples, the conversion of the pixels to RGB may being performed to prepare the pixels to be output to a display device.

At block 806, a table of backlight reduction values is retrieved. In an example, the table of backlight reduction values may be determined and created in any suitable manner. For example, the table of backlight reduction values may be created based on user testing to reduce a backlight brightness and power usage while maintaining a high text readability. The table of backlight reduction values may be stored in a memory of an information handling system.

At block 808, a backlight brightness and power usage are reduced. Based on the use of the table of backlight reduction values, text sharpening may be linked to a display brightness setting for power savings within the display device. At block 810, an ambient light sensor input is received. At block 812, the backlight reduction is adjusted based on the ambient light sensor input, and the flow ends at block 814. In certain examples, as a value of the ambient light sensor input reduces, the backlight reduction may be increased.

Figure 9:
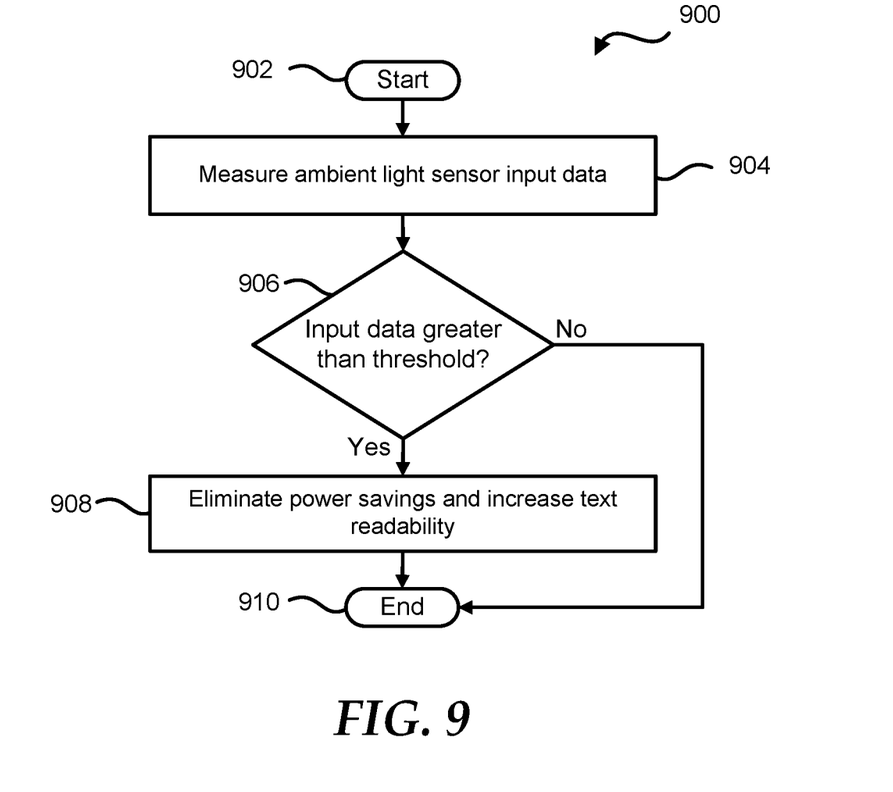
FIG. 9 is a flow diagram of a method for eliminating power savings and increasing text readability according to at least one embodiment of the present disclosure.

FIG. 9 illustrates a flow diagram of a method 900 for eliminating power savings and increasing text readability according to at least one embodiment of the present disclosure, starting at block 902. In an example, the method 900 may be performed by any suitable component including, but not limited to, EC 134 or TCON 136 of FIG. 1, and processor 1102 or 1104 or BIOS 1140 of FIG. 11. Not every method step set forth in this flow diagram is always necessary, and certain steps of the methods may be combined, performed simultaneously, in a different order, or perhaps omitted, without varying from the scope of the disclosure.

At block 904, an ambient light sensor input data or value is measured or received. At block 906, a determination is made whether the input data is greater than a threshold. In certain examples, the threshold value may be any suitable value, such as 1300 lux, 1350 lux, 1400 lux, 1450 lux, or the like. If the input data is greater than the threshold value, power savings is eliminated and pixel sharpening is performed at block 908, and the flow ends at block 910. If the input data is not greater than the threshold, the flow ends at block 910. In certain examples, power savings may result from not performing pixel sharpening. However, when an amount of ambient light is above the threshold, the power savings is eliminated by pixel sharpening being performed to increased text readability in high ambient light settings.

Figure 10:
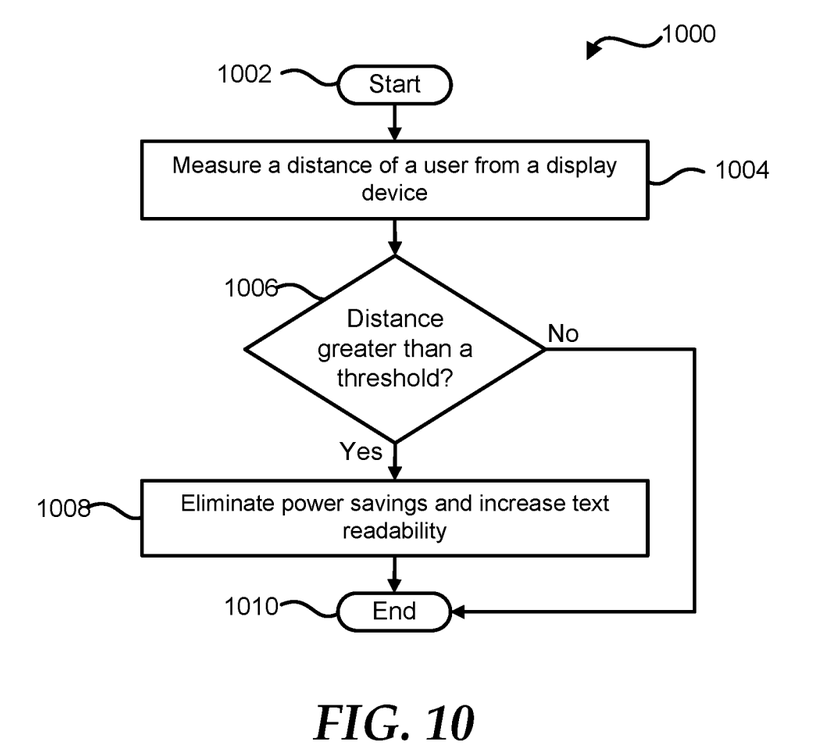
FIG. 10 is a flow diagram of another method for eliminating power savings and increasing text readability according to at least one embodiment of the present disclosure.

FIG. 10 illustrates a flow diagram of a method 1000 for eliminating power savings and increasing text readability according to at least one embodiment of the present disclosure, starting at block 1002. In an example, the method 1000 may be performed by any suitable component including, but not limited to, EC 134 or TCON 136 of FIG. 1, and processor 1102 or 1104 or BIOS 1140 of FIG. 11. Not every method step set forth in this flow diagram is always necessary, and certain steps of the methods may be combined, performed simultaneously, in a different order, or perhaps omitted, without varying from the scope of the disclosure.

At block 1004, a distance a user is from a display device is measured. In an example, the distance may be made by any suitable device, such as a user presence detect device. At block 1006, a determination is made whether the distance is greater than a threshold. In certain examples, the threshold may be any suitable distance, such as sixteen inches, seventeen inches, eighteen inches, nineteen inches, or the like.

If the distanced is greater than the threshold, power savings is eliminated and pixel sharpening is performed at block 1008, and the flow ends at block 1010. If the distance is not greater than the threshold, the flow ends at block 1010. In certain examples, power savings may result from not performing pixel sharpening. However, when the distance of the user from the display device is above the threshold, the power savings is eliminated by pixel sharpening being performed to increased text readability when the user is far from the display device.

FIG. 11 shows a generalized embodiment of an information handling system 1100 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 1100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 1100 can include processing resources for executing machine-executable code, such as a central processing unit (CPU), a programmable logic array (PLA), an embedded device such as a System-on-a-Chip (SoC), or other control logic hardware. Information handling system 1100 can also include one or more computer-readable medium for storing machine-executable code, such as software or data. Additional components of information handling system 1100 can include one or more storage devices that can store machine-executable code, one or more communications ports for communicating with external devices, and various input and output (I/O) devices, such as a keyboard, a mouse, and a video display. Information handling system 1100 can also include one or more buses operable to transmit information between the various hardware components.

Information handling system 1100 can include devices or modules that embody one or more of the devices or modules described below and operates to perform one or more of the methods described below. Information handling system 1100 includes a processors 1102 and 1104, an input/output (I/O) interface 1110, memories 1120 and 1125, a graphics interface 1130, a basic input and output system/universal extensible firmware interface (BIOS/UEFI) module 1140, a disk controller 1150, a hard disk drive (HDD) 1154, an optical disk drive (ODD) 1156, a disk emulator 1160 connected to an external solid state drive (SSD) 1162, an I/O bridge 1170, one or more add-on resources 1174, a trusted platform module (TPM) 1176, a network interface 1180, a management device 1190, and a power supply 1195. Processors 1102 and 1104, I/O interface 1110, memory 1120, graphics interface 1130, BIOS/UEFI module 1140, disk controller 1150, HDD 1154, ODD 1156, disk emulator 1160, SSD 1162, I/O bridge 1170, add-on resources 1174, TPM 1176, and network interface 1180 operate together to provide a host environment of information handling system 1100 that operates to provide the data processing functionality of the information handling system. The host environment operates to execute machine-executable code, including platform BIOS/UEFI code, device firmware, operating system code, applications, programs, and the like, to perform the data processing tasks associated with information handling system 1100.

In the host environment, processor 1102 is connected to I/O interface 1110 via processor interface 1106, and processor 1104 is connected to the I/O interface via processor interface 1108. Memory 1120 is connected to processor 1102 via a memory interface 1122. Memory 1125 is connected to processor 1104 via a memory interface 1127. Graphics interface 1130 is connected to I/O interface 1110 via a graphics interface 1132 and provides a video display output 1136 to a video display 1134. In a particular embodiment, information handling system 1100 includes separate memories that are dedicated to each of processors 1102 and 1104 via separate memory interfaces. An example of memories 1120 and 1130 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 1140, disk controller 1150, and I/O bridge 1170 are connected to I/O interface 1110 via an I/O channel 1112. An example of I/O channel 1112 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 1110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 1140 includes BIOS/UEFI code operable to detect resources within information handling system 1100, to provide drivers for the resources, initialize the resources, and access the resources. BIOS/UEFI module 1140 includes code that operates to detect resources within information handling system 1100, to provide drivers for the resources, to initialize the resources, and to access the resources.

Disk controller 1150 includes a disk interface 1152 that connects the disk controller to HDD 1154, to ODD 1156, and to disk emulator 1160. An example of disk interface 1152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 1160 permits SSD 1164 to be connected to information handling system 1100 via an external interface 1162. An example of external interface 1162 includes a USB interface, an IEEE 4394 (Firewire) interface, a proprietary interface, or a combination thereof. Alternatively, solid-state drive 1164 can be disposed within information handling system 1100.

I/O bridge 1170 includes a peripheral interface 1172 that connects the I/O bridge to add-on resource 1174, to TPM 1176, and to network interface 1180. Peripheral interface 1172 can be the same type of interface as I/O channel 1112 or can be a different type of interface. As such, I/O bridge 1170 extends the capacity of I/O channel 1112 when peripheral interface 1172 and the I/O channel are of the same type, and the I/O bridge translates information from a format suitable to the I/O channel to a format suitable to the peripheral channel 1172 when they are of a different type. Add-on resource 1174 can include a data storage system, an additional graphics interface, a network interface card (NIC), a sound/video processing card, another add-on resource, or a combination thereof. Add-on resource 1174 can be on a main circuit board, on separate circuit board or add-in card disposed within information handling system 1100, a device that is external to the information handling system, or a combination thereof.

Network interface 1180 represents a NIC disposed within information handling system 1100, on a main circuit board of the information handling system, integrated onto another component such as I/O interface 1110, in another suitable location, or a combination thereof. Network interface device 1180 includes network channels 1182 and 1184 that provide interfaces to devices that are external to information handling system 1100. In a particular embodiment, network channels 1182 and 1184 are of a different type than peripheral channel 1172 and network interface 1180 translates information from a format suitable to the peripheral channel to a format suitable to external devices. An example of network channels 1182 and 1184 includes InfiniBand channels, Fibre Channel channels, Gigabit Ethernet channels, proprietary channel architectures, or a combination thereof. Network channels 1182 and 1184 can be connected to external network resources (not illustrated). The network resource can include another information handling system, a data storage system, another network, a grid management system, another suitable resource, or a combination thereof.

Management device 1190 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 1100. In particular, management device 1190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 1100, such as system cooling fans and power supplies. Management device 1190 can include a network connection to an external management system, and the management device can communicate with the management system to report status information for information handling system 1100, to receive BIOS/UEFI or system firmware updates, or to perform other task for managing and controlling the operation of information handling system 1100.

Management device 1190 can operate off of a separate power plane from the components of the host environment so that the management device receives power to manage information handling system 1100 when the information handling system is otherwise shut down. An example of management device 1190 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 1190 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a display device to output pixels associated with a text font; and
   a processor to:
   convert red, green, blue (RGB) pixels to image perspective transformation (IPT) pixels;
   sharpen one or more of the IPT pixels that do not have color, wherein the sharpening of the one or more of the IPT pixels identifies edges of the text font and defines widths of the text font;
   correct edge overshoot and edge undershoot created by a digital filter, wherein the edge overshoot and the edge undershoot are corrected for each IPT pixel associated with the text edges;
   reduce noise enhancement in the sharpened IPT pixels;
   retain grey text portions of each of the sharpened IPT pixels;
   convert the IPT pixels to new RGB pixels; and
   output the new RGB pixels to the display device.

2. The information handling system of claim 1, wherein the reduction of the noise enhancement in the sharpened IPT pixels, the processor further to:
   compare a first digital value of a pixel with a second digital value of neighboring pixel; and
   in response to a difference between the first digital value and the second digital value being greater than a predetermined value, perform additionally sharpening of the pixel.

3. The information handling system of claim 1, wherein the retaining of the grey text portions of the each of the sharpened IPT pixels, the processor further to:
   determine a different digital value for the each of the sharpened IPT pixels; and
   perform additional sharpening for each of the sharpened IPT pixels with a digital value that is greater than a threshold value.

4. The information handling system of claim 1, wherein the processor further to:
   determine an ambient light value; and
   when the ambient light value is above a threshold value, perform additional sharpening of the RGB pixels to increase legibility on the display device of the information handling system.

5. The information handling system of claim 4, wherein when the ambient light value is below the threshold value, the processor to enable power savings within the information handling system.

6. The information handling system of claim 1, wherein the processor further to:
   determine a distance between a user and the display device of the information handling system; and
   when the distance is above a threshold value, perform additional sharpening of the RGB pixels to increase legibility on the display device of the information handling system.

7. The information handling system of claim 1, wherein when the ambient light value is below the threshold value, the processor to enable power savings within the information handling system.

8. A method comprising:
   converting red, green, blue (RGB) pixels to image perspective transformation (IPT) pixels;
   sharpening, by a digital filter, one or more of the IPT pixels that do not have color, wherein the sharpening of the one or more of the IPT pixels identifies text edges and defines text font widths;
   correcting edge overshoot and undershoot created by the digital filter, wherein the overshoot and the undershoot are corrected for each IPT pixel associated with the text edges;

reducing noise enhancement in the sharpened IPT pixels;
retaining grey text portions of each of the sharpened IPT pixels;
converting the IPT pixels to new RGB pixels; and
outputting the new RGB pixels to a display device.

9. The method of claim 8, wherein the reducing of the noise enhancement in the sharpened IPT pixels, the method further comprises:
comparing a first digital value of a pixel with a second digital value of neighboring pixel; and
in response to a difference between the first digital value and the second digital value being greater than a predetermined value, performing additionally sharpening of the pixel.

10. The method of claim 8, wherein the retaining of the grey text portions of the each of the sharpened IPT pixels, the method further comprises:
determining a different digital value for the each of the sharpened IPT pixels; and
performing additional sharpening for each of the sharpened IPT pixels with a digital value that is greater than a threshold value.

11. The method of claim 8, further comprising when an ambient light value is above a threshold value, performing additional sharpening of the RGB pixels to increase legibility on the display device of the information handling system.

12. The method of claim 11, further comprising when the ambient light value is below the threshold value, enabling power savings within the information handling system.

13. The method of claim 8, further comprising:
determining a distance between a user and the display device; and
when the distance is above a threshold value, performing additional sharpening of the RGB pixels to increase legibility on the display device.

14. The method of claim 11, further comprising when the ambient light value is below the threshold value, enabling power savings within an information handling system.

15. An information handling system comprising:
converting red, green, blue (RGB) pixels to image perspective transformation (IPT) pixels;
sharpening, by a digital filter, one or more of the IPT pixels that do not have color, wherein the sharpening of the one or more of the IPT pixels identifies text edges and defines text font widths;
correcting edge overshoot and undershoot created by the digital filter, wherein the overshoot and the undershoot are corrected for each IPT pixel associated with the text edges;
reducing noise enhancement in the sharpened IPT pixels, wherein the reducing of the noise enhancement in the sharpened IPT pixels includes:
comparing a first digital value of a pixel with a second digital value of neighboring pixel; and
in response to a difference between the first digital value and the second digital value being greater than a predetermined value, performing additionally sharpening of the pixel
retaining grey text portions of each of the sharpened IPT pixels, wherein the retaining of the grey text portions of the each of the sharpened IPT pixels includes:
determining a different digital value for the each of the sharpened IPT pixels; and
performing additional sharpening for each of the sharpened IPT pixels with a digital value that is greater than a threshold value;
converting the IPT pixels to new RGB pixels; and
outputting the new RGB pixels to a display device.

16. The method of claim 15, further comprising when an ambient light value is above a threshold value, performing additional sharpening of the RGB pixels to increase legibility on the display device of the information handling system.

17. The method of claim 16, further comprising when the ambient light value is below the threshold value, enabling power savings within the information handling system.

18. The method of claim 15, further comprising when a distance between a user and the display device is above a threshold value, performing additional sharpening of the RGB pixels to increase legibility on the display device.

19. The method of claim 18, further comprising when the ambient light value is below the threshold value, enabling power savings within the information handling system.

20. The method of claim 18, further comprising averaging pixel darkness levels across a text font width to darken the text font.

* * * * *